JOHN BAUER.

Improvement in Harness Trimmings.

No. 4,580. Reissued Oct. 10, 1871.

Witnesses,
P. J. Brown
R. D. Smith

John Bauer,
by his Atty.,
J. S. Brown.

AM. PHOTO-LITHOGRAPHIC CO. N.Y. (OSBORNE'S PROCESS)

UNITED STATES PATENT OFFICE.

JOHN BAUER, OF NEWARK, NEW JERSEY.

IMPROVEMENT IN HARNESS-TRIMMINGS.

Specification forming part of Letters Patent No. 116,536, dated July 4, 1871; reissue No. 4,580, dated October 10, 1871.

*To all whom it may concern:*

Be it known that I, JOHN BAUER, of Newark, in the county of Essex and State of New Jersey, have invented an Improvement in Harness-Trimmings; and I do hereby declare that the following is a full and exact description thereof, reference being had to the accompanying drawing making part of this specification—

Figure 1:
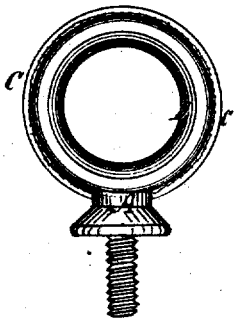
Figure 2:
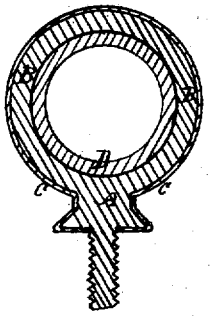
Figure 3:
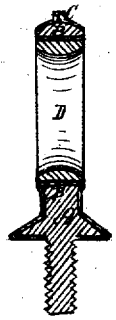
Figure 4:
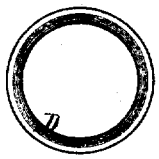

Figure 1 being a side view of a terret constructed with my improvement; Fig. 2, a central section thereof through the body of the ring; Fig. 3, a transverse central section of the same; Fig. 4, view of a part detached.

Like letters designate corresponding parts in all the figures.

As a harness-maker I have found from experience that the lining of the rings, and other similar articles of harness-trimmings of rolled sheet-metal, which, having first been formed into a ring and the ends thereof soldered together, is finally pressed into the interior of the harness-ring, is of short duration, requiring frequent replacement, does not answer the purpose intended, and is an injury to the harness for the reason that the friction of the reins, or other parts of the harness wearing on this thin sheet-metal lining soon cuts it through, and the sharp edges of the worn sheet-metal in turn cut the reins, so that the device is worse than useless. To obviate these defects I employ a cast-metal ring, or other form, for the lining, being made whole, with no ends to be joined together by solder liable to break apart, and of any required thickness, sufficient to last without replacing, as long as the harness-ring or other article of harness-trimming itself lasts. The lining, in fact, is substantially a short tube. It is placed within the terret, ring, buckle, or other equivalent part of the harness-trimmings; and with a mandrel, or other tool, its edges are turned up or outward, to keep it in place and burnished, when it becomes a permanent lining of the ring, or other part. The ring lining is made of brass, white-metal, or equivalent metal or alloy.

Thus, as represented in the drawing, the terret A has its ring B first covered with its leather or other covering, C, and then the cast metal or whole ring-lining D, shown in cross-section in Fig. 3 and separate in Fig. 4, is inserted in the interior thereof. The inner surface of the ring B is preferably made more or less flattened in form, so that the outer surface of the lining shall fit and be held the more securely therein, and require less turning up at its edges.

The advantages derived from this improved lining over a sheet-metal soldered lining are especially its greater strength, firmness, and durability, and that its surface is never liable to become rough by wearing through, nor to cut the reins or other parts of the harness passing through the same by the edges produced thereby.

What I claim as my invention, and desire to secure by Letters Patent, is—

A terret, ring, or similar article of harness-trimmings lined with a cast-metal ring or piece, D, fitting the interior of the said terret, or ring, substantially as and for the purpose herein specified.

JOHN BAUER.

Witnesses:
J. S. BROWN,
D. J. BROWN.

(72)